United States Patent
Spinelli et al.

(10) Patent No.: US 8,571,729 B2
(45) Date of Patent: Oct. 29, 2013

(54) WIND CALCULATION SYSTEM USING A CONSTANT BANK ANGLE TURN

(75) Inventors: Charles B. Spinelli, Bainbridge Island, WA (US); Bobby D. Taylor, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/368,831

(22) Filed: Feb. 8, 2012

(65) Prior Publication Data

US 2013/0204467 A1 Aug. 8, 2013

(51) Int. Cl.
*G05D 1/00* (2006.01)
*G05D 3/00* (2006.01)

(52) U.S. Cl.
USPC .......................................................... 701/6

(58) Field of Classification Search
USPC .................................................. 701/3–8, 11
See application file for complete search history.

(56) References Cited

U.S. PATENT DOCUMENTS

| 5,051,750 A | 9/1991 | Hollister |
| 2002/0193916 A1* | 12/2002 | Katz et al. ........................ 701/4 |
| 2005/0094851 A1* | 5/2005 | Bodin et al. .................. 382/106 |

FOREIGN PATENT DOCUMENTS

| EP | 2390670 A2 | 11/2011 |
| WO | WO9956188 A1 | 11/1999 |

OTHER PUBLICATIONS

Zahar, "How to . . . Fly a Hold," flight instruction white paper, 6 Pages, accessed Feb. 3, 2012, http://pilotlist.org/zahar/howto.
"Air Classics E6-B Flight Computer Instructions," Aviation Supplies & Academics, Inc., ISBN 1-56-27-421-2, 38 Pages, accessed Feb. 3, 2012, http://www.asa2fly.com/files/support/E6B_Manual.pdf.
International Search Report and Written Opinion, dated Mar. 11, 2013, regarding Application No. PCT/US2012/069235, 12 pages.

* cited by examiner

*Primary Examiner* — Mary Cheung
(74) *Attorney, Agent, or Firm* — Yee & Associates, P.C.

(57) ABSTRACT

A method and apparatus for operating an aircraft. The aircraft is flown at a constant bank angle in which the aircraft crosses an intended ground track for the aircraft. Information is identified about a wind using positions of the aircraft flying at the constant bank angle.

6 Claims, 6 Drawing Sheets

WIND CALCULATION SYSTEM USING A CONSTANT BANK ANGLE TURN

BACKGROUND INFORMATION

1. Field

The present disclosure relates generally to aircraft and, in particular, to operating unmanned aerial vehicles (UAVs). Still more particularly, the present disclosure relates to the automatic calculation of a heading from an automatically determined wind correction angle by the use of a constant bank angle to reduce repeated course corrections when a cross wind is not accounted for along a flight route.

2. Background

Wind is an environmental factor that may affect the flight of an aircraft. For example, a tailwind is a wind that blows in the direction of travel of the aircraft. A tailwind may increase the relative ground speed of the aircraft and may reduce the total time required to reach a destination. In contrast, a headwind blows against the direction of travel of an aircraft and may have the opposite effect.

Other types of winds also may affect the ground track for the flight of an aircraft. A ground track is the path of the aircraft on the surface of the Earth directly below the aircraft. More specifically, a ground track may be the intended course or direction of travel over the surface of the Earth with respect to north. For example, a crosswind is a portion of the wind that may cause an aircraft to drift off course. The heading is the direction in which the longitudinal axis of the aircraft is pointing in relation to magnetic north.

Adjustments may be made to the heading of the aircraft in response to a crosswind such that a course along an intended ground track is maintained. These adjustments typically include having knowledge of the direction and speed of the wind.

Typically, information about winds may be calculated from information obtained through the use of a weather balloon. The information obtained from the weather balloon may be used by a ground location, such as an air traffic control service. The weather balloon contains equipment configured to record the position of the weather balloon at different locations. The weather balloon may also be configured to record other information, such as speed and direction of the wind, as the weather balloon travels through the atmosphere.

These weather balloons, however, may not provide as much information as desired about the winds. For example, a weather balloon typically only gives a vertical profile of winds. Additional weather balloons may be used to provide information about the wind in larger areas. This use of weather balloons may be more expensive and time consuming than desired. Additionally, the use of weather balloons also may be less feasible over areas, such as those that are used as flight corridors for commercial aircraft. In the case of flight operations of unmanned aerial vehicles, course routing may occur over or within airspace in which information about the wind is not available.

Further, to receive information about the wind from a secondary source, the aircraft requires hardware configured to receive the information from an air traffic control service. In the case of unmanned aerial vehicles, it may be prohibitive both in payload restrictions and payload space restrictions to install the necessary systems to receive information about the wind to determine a course correction angle for the wind.

Therefore, it would be desirable to have a method and apparatus that takes into account some of the issues discussed above as well as possibly other issues.

SUMMARY

In one illustrative embodiment, a method for operating an aircraft is present. The aircraft is flown at a constant bank angle in which the aircraft crosses an intended ground track for the aircraft. Information is identified about a wind using positions of the aircraft flying at the constant bank angle.

In another illustrative embodiment, a method for operating an unmanned aerial vehicle is present. The unmanned aerial vehicle is flown across an intended ground track at a constant bank angle. Positions of the unmanned aerial vehicle are identified while the unmanned aerial vehicle flies at the constant bank angle. A speed and a direction of a wind are identified using the positions of the unmanned aerial vehicle and the constant bank angle. The unmanned aerial vehicle is operated to fly on the intended ground track using the speed and the direction of the wind.

In yet another illustrative embodiment, an aircraft management system comprises a computer system. The computer system is configured to receive information about an aircraft flying along a maneuver ground track with a constant bank angle. The maneuver ground track crosses an intended ground track of the aircraft. The computer system is further configured to identify information about a wind from positions of the aircraft along the maneuver ground track.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the different illustrative embodiments recognize and take into account that aircraft without equipment configured to identify a course correction angle taking into account the wind; aircraft, such as unmanned aerial vehicles, may still identify information about the winds that allows the aircraft to be operated in a desired manner.

The illustrative embodiments recognize and take into account that an aircraft may fly at a constant bank angle turn in circles. The deviation or drift from the center point of each circle flown by the aircraft may be used to identify information about the wind. The illustrative embodiments recognize and take into account that as the number of deviations increase from an intended ground track, such as those from flying circles, the range of an unmanned aerial vehicle may be reduced in a manner making it more difficult to perform mission objectives.

The different illustrative embodiments recognize and take into account that this type of process, however, may use time and resources that may not be applied to the mission of the aircraft. For example, flying in circles to identify wind in the vicinity of the aircraft may take time and fuel that is otherwise used to fly the aircraft along a flight path. As a result, the aircraft may not have as long of a range as desired.

Figure 1:
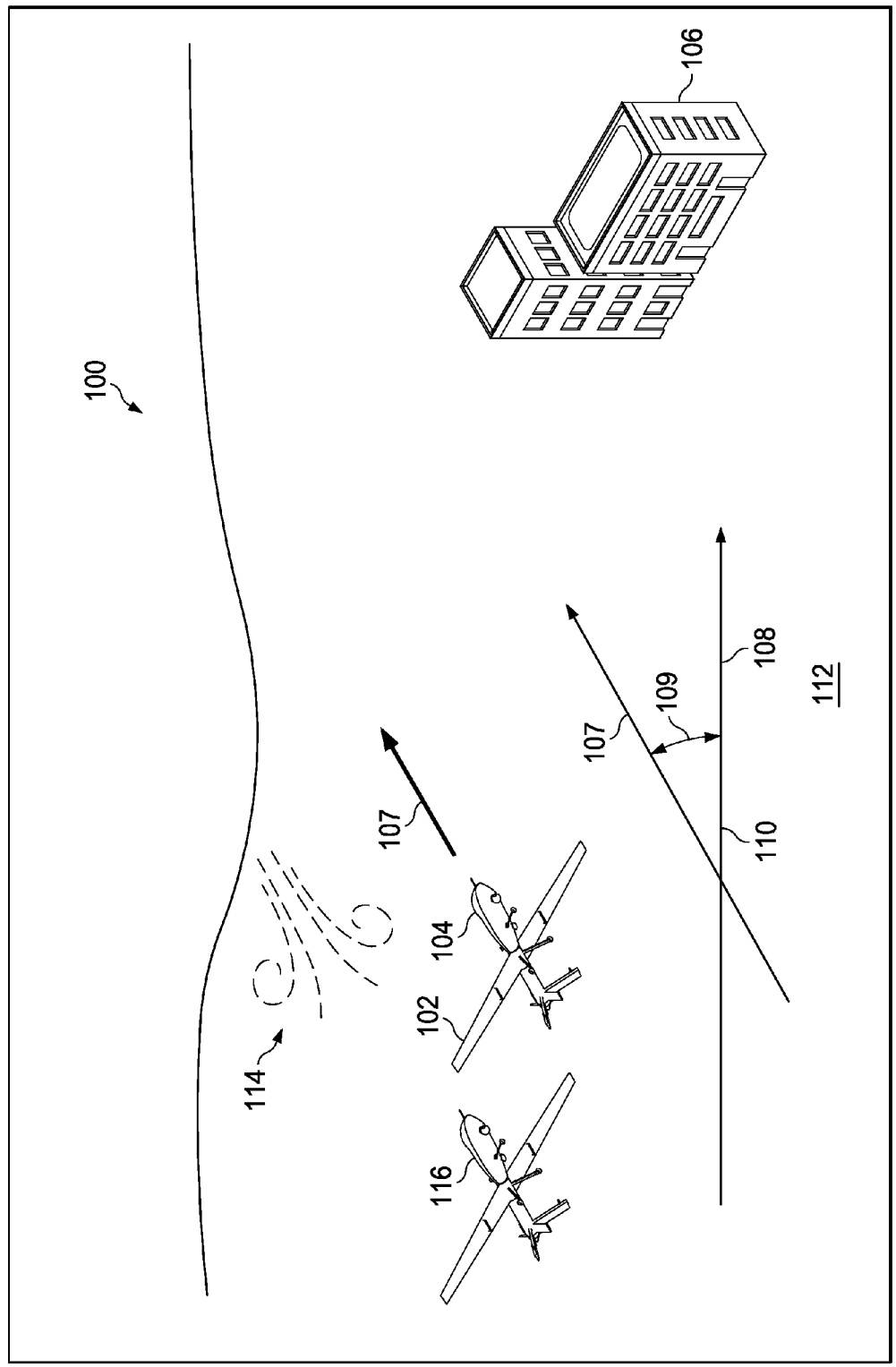
FIG. 1 is an illustration of an aircraft environment in accordance with an illustrative embodiment.

With reference now to the figures and, in particular, with reference to FIG. 1, an illustration of an aircraft environment is depicted in accordance with an illustrative embodiment. Aircraft environment 100 is an example of an environment in which aircraft 102 may be operated. In this illustrative example, aircraft 102 may take the form of unmanned aerial vehicle (UAV) 104.

As depicted, aircraft 102 may be controlled from remote position 106 in these illustrative examples. Remote position 106 may take various forms. For example, as depicted, remote position 106 may be a building, a vehicle, an air traffic control tower, a ship, a ground station, or some other suitable position.

As depicted, aircraft 102 flies in the air at a selected heading such that the actual path of flight follows intended ground track 110. In other words, desired course 108 following intended ground track 110 is the result of flying in the direction of heading 107 related to wind 114 resulting in wind correction angle 109. Wind correction angle 109 is the angle between desired course 108 when following intended ground track 110 and heading 107 needed to fly on intended ground track 110 when wind 114 is present.

In the illustrative examples, intended ground track 110 is a path on ground 112 that is planned for aircraft 102. Intended ground track 110 may be set, for example, without limitation, in a flight plan, by an operator of aircraft 102, or some other suitable source.

Maintaining flight over intended ground track 110 may be desirable for a number of different reasons. When used with reference to items, "a number of" items means one or more items. For example, a number of different reasons is one or more different reasons.

One reason for maintaining flight over intended ground track 110 is that aircraft 102 may be performing surveillance of ground 112 along intended ground track 110. Deviation from intended ground track 110 may result in an inability to obtain information about ground 112 along intended ground track 110. More specifically, aircraft 102 may not be able to take pictures or video of target objects that may be on ground 112 if aircraft 102 deviates far enough away from intended ground track 110. In other cases, flying aircraft on intended ground track 110 may be part of a plan to organize traffic to avoid aircraft from flying closer to each other than desired.

In one illustrative example, maintaining flight of aircraft 102 along intended ground track 110 may be performed in order to ensure the vehicle is always in the vicinity of friendly forces and away from known enemy force locations. In this manner, aircraft 102 may be safely recovered in the event of an in-flight emergency requiring immediate recovery of aircraft 102.

In these illustrative examples, wind 114 is an example of an environmental condition that may cause aircraft 102 to deviate from intended ground track 110. With information about wind 114, aircraft 102 may be operated to maintain flight along intended ground track 110. Wind 114 may be a crosswind in these illustrative examples.

In these illustrative examples, aircraft 102 may be operated in a manner that identifies wind 114 that is present in the vicinity of aircraft 102. Wind 114 is in the vicinity of aircraft 102 when wind 114 has the potential to affect the flight of aircraft 102 over intended ground track 110.

The identification of information about wind 114 may be used to operate aircraft 102 or may be used by other aircraft, such as aircraft 116. In this illustrative example, aircraft 102 may directly transmit this information to aircraft 116.

In other illustrative examples, aircraft 102 may transmit this information to remote position 106. In turn, remote position 106 may transmit this information to aircraft 116 or to some other aircraft in need of information about wind 114.

In still other illustrative examples, if aircraft 116 is an unmanned aerial vehicle, aircraft 116 may also be controlled by an operator at remote position 106 or other remote positions. That operator may use the information about wind 114 to operate aircraft 116.

In these illustrative examples, aircraft 102 may be operated in a manner that does not cause aircraft 102 to deviate from intended ground track 110 as much as using other techniques for identifying wind 114. In these illustrative examples, true airspeed of aircraft 102 is the speed of aircraft 102 relative to the air mass in which aircraft 102 flies.

Figure 2:
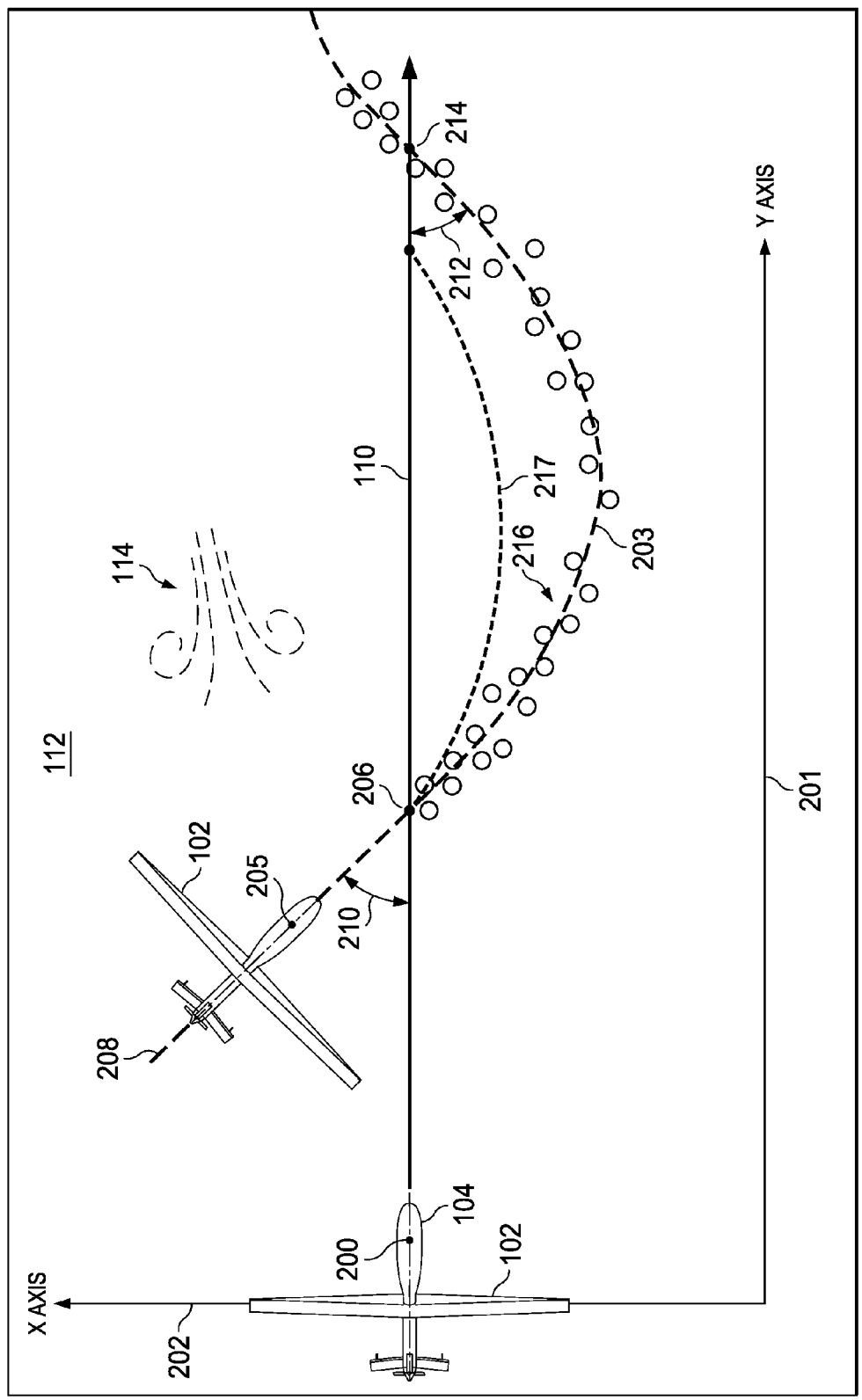
FIG. 2 is an illustration of a maneuver that is performed by an aircraft to identify wind information in accordance with an illustrative embodiment.

Turning now to FIG. 2, an illustration of a maneuver performed by an aircraft to identify information about the wind is depicted in accordance with an illustrative embodiment. In this illustrative example, aircraft 102 is in position 200 and flies along intended ground track 110. At some point, it may be desirable to determine whether wind 114 is present in a manner that affects the flight of aircraft 102 on intended ground track 110.

Position 200 is a position of aircraft 102 relative to intended ground track 110. Position 200 may be measured using two-dimensional coordinates. In this illustrative example, x-axis 202 and y-axis 201 define a plane relative to the surface of ground 112. In some illustrative examples, the coordinates may take the form of latitude and longitude.

Aircraft 102 may deviate from intended ground track 110 to perform a maneuver relative to intended ground track 110. This maneuver may be for a short period of time such that the mission of aircraft 102 is affected as little as possible or desired. The maneuver is performed to identify information about wind 114.

In these illustrative examples, information about aircraft 102 is identified while aircraft 102 performs the maneuver along maneuver ground track 203. For example, without limitation, initial heading, true airspeed, position, and bank angle are some types of information that may be identified for aircraft 102.

In this illustrative example, the maneuver performed by aircraft 102 may be one or more banking maneuvers in which aircraft 102 turns with a constant bank angle. The maneuver may include crossing intended ground track 110 on maneuver ground track 203. In these illustrative examples, aircraft 102 flying on maneuver ground track 203 crosses intended ground track 110 at a constant heading. In other words, aircraft 102 does not change direction while aircraft 102 flies across intended ground track 110 along maneuver ground track 203 at position 206. In this illustrative example, the true airspeed heading is unknown but may be solved by using information about aircraft 102 that is identified while aircraft 102 performs the maneuver.

For example, aircraft 102 may fly to a side of intended ground track 110, as illustrated with aircraft 102 in position 205. From position 205, aircraft 102 may fly across intended ground track 110 along maneuver ground track 203 to position 206. In the illustrative examples, this portion of the maneuver is flown with wings level. In other words, a bank angle of about zero is used.

As depicted, aircraft 102 flies across intended ground track 110 at position 206 when following maneuver ground track 203. Constant bank angle is used by aircraft 102 when aircraft 102 reaches the vicinity of position 206. Maneuver ground track 203 is the ground track which results from the constant bank angle flown by aircraft 102 when making a turn in performing the maneuver.

A bank angle, in these illustrative examples, is an angle at which aircraft 102 is inclined about longitudinal axis 208 for aircraft 102. Longitudinal axis 208 is an axis that extends centrally through aircraft 102.

As depicted, angle 210 is an angle of maneuver ground track 203 for aircraft 102 relative to intended ground track 110. For example, the turn in the maneuver performed by aircraft 102 to fly along maneuver ground track 203 may cross intended ground track 110 with angle 210 being about 45 degrees. Of course, the crossing may be at other angles, depending on the particular implementation. Angle 210 may not be known with a precise value in the illustrative examples. The bank angle flown by aircraft 102 may be about five degrees in this illustrative example.

In a similar fashion, angle 212 also may be a constant angle when aircraft 102 crosses intended ground track 110 at position 214. Angle 212 may be the same or different from angle 210, depending on the particular implementation.

Aircraft 102 may fly across intended ground track 110 at position 214 with a second constant bank angle. This second constant bank angle may be the same as the constant bank angle at which aircraft 102 flies across intended ground track 110 at position 206. In this example, the direction of the turn with the constant bank angle is in the opposite direction.

In these illustrative examples, the angle at which aircraft 102 crosses intended ground track 110 at position 206 is unknown but is related to the initial heading for aircraft 102 in this maneuver. The initial heading is a piece of data that may be used to identify information about wind 114. The initial heading may be identified using a least squares procedure as described below.

In these illustrative examples, aircraft 102 identifies positions 216. Positions 216 are positioned on the ground that aircraft 102 identifies while flying on maneuver ground track 203. Positions 216 may be the same or different from positions along maneuver ground track 203, depending on the accuracy at which positions 216 are measured by aircraft 102.

Positions 216 may be identified in a number of different ways. For example, positions 216 may be identified using a location identification system on board aircraft 102. The on board location system may be, for example, a global positioning system receiver. Positions 216 are recorded by aircraft 102 in these illustrative examples. Positions 216 may not exactly track maneuver ground track 203, depending on the accuracy of the location identification system. The amount of deviation of positions 216 from maneuver ground track 203 depends on the accuracy of the on board location system used in aircraft 102.

If wind 114 is absent, positions 216 may be the same as positions along zero wind ground track 217. The presence of wind 114 may result in one or more of positions 216 being different from corresponding positions on zero wind ground track 217. In other words, a position in positions 216 may be different from a corresponding position along zero wind ground track 217 that was predicted for aircraft 102 without wind 114.

In these illustrative examples, positions 216, the constant bank angle, and the true airspeed of aircraft 102 may be used to identify information about wind 114. This identified information about wind 114 may include values for wind speed and wind direction. This process may include a least squares analysis that identifies values for wind speed and wind direction as best values for these parameters.

With the identification of information about wind 114, the operation of aircraft 102 may be adjusted such that aircraft 102 flies along intended ground track 110 in the presence of wind 114. In particular, heading 107 of aircraft 102 may be adjusted such that aircraft 102 maintains intended ground track 110. This adjustment may be made without the need for repeated banking turn maneuvers to maintain intended ground track 110.

Further, wind data calculated from the maneuver along maneuver ground track 203 may be used to operate aircraft 102 to still fly substantially along intended ground track 110 as compared to other methods in which aircraft 102 flies in circles. Further, with information about wind 114, the flight of other aircraft also may be adjusted such that those aircraft fly along an intended ground track when those aircraft are in the vicinity of wind 114 that affects the flight of the other aircraft.

This type of maneuver may be especially useful when aircraft 102 takes the form of unmanned aerial vehicle 104. The maneuver, the identification of wind information, the identification of wind correction angle 109 in FIG. 1, the adjustment of heading 107, or some combination thereof may be performed automatically by unmanned aerial vehicle 104. In other words, a remote operator of unmanned aerial vehicle 104 does not need to perform these tasks to maintain the flight of unmanned aerial vehicle 104 over intended ground track 110.

Figure 3:
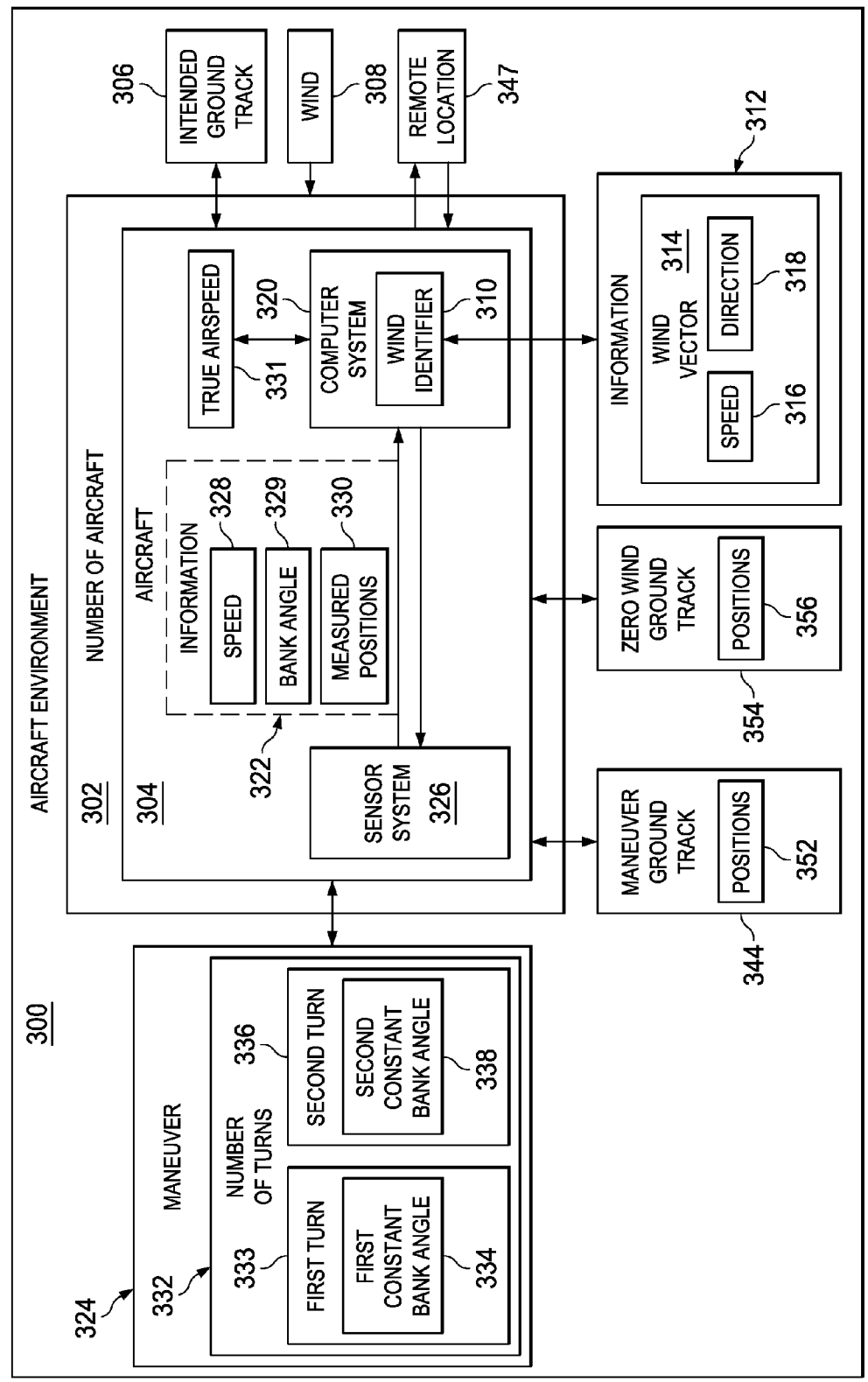
FIG. 3 is an illustration of a block diagram of an aircraft environment in accordance with an illustrative embodiment.

Turning now to FIG. 3, an illustration of a block diagram of an aircraft environment is depicted in accordance with an illustrative embodiment. In this illustrative example, aircraft environment 100 in FIG. 1 is an example of one implementation for aircraft environment 300.

As depicted, number of aircraft 302 operates within aircraft environment 300. In this illustrative example, aircraft 304 within number of aircraft 302 may fly on intended ground track 306. In these illustrative examples, wind 308 may affect the operation of aircraft 304 with respect to intended ground track 306.

In these illustrative examples, wind identifier 310 is used to identify information 312 about wind 308. In these illustrative examples, information 312 may take the form of wind vector 314. Wind vector 314 may include speed 316 of wind 308 and direction 318 of wind 308.

In these illustrative examples, wind identifier 310 may be implemented in hardware, software, or a combination of the two. In these illustrative examples, wind identifier 310 may be implemented within computer system 320. In these illustrative examples, wind identifier 310 is located in aircraft 304.

As depicted, aircraft 304 generates information 322 during flight that is used by wind identifier 310 to identify information 312 about wind 308. In particular, information 322 may be generated during maneuver 324. Maneuver 324 may be a maneuver that deviates from intended ground track 306 and is performed relative to intended ground track 306.

As depicted, information 322 is generated using sensor system 326 in aircraft 304. Sensor system 326 may include a location system. This location system may be, for example, an inertial measurement unit, a global positioning system receiver, an airspeed indicator, an altimeter, an attitude sensor, an outside air temperature probe, and other suitable types of systems that are configured to generate information about positions for aircraft 304.

In these illustrative examples, information 322 may include speed 328 of aircraft 304, bank angle 329 for aircraft 304, and measured positions 330 of aircraft 304 during the performance of maneuver 324. The bank angle may be identified from information generated by an attitude sensor.

Additionally, computer system 320 may identify true airspeed 331 using information 322. Examples of information 322 that may be used to identify true airspeed 331 include, for example, indicated airspeed from the airspeed calibration data, the compressibility correction, and air density. Airspeed calibration data is the correction from indicated airspeed to calibrated airspeed. The compressibility correction is the correction from calibrated to equivalent airspeed. This correction is negligible at low subsonic speeds. Air density is calculated from pressure altitude and outside air temperature.

In these illustrative examples, maneuver 324 takes the form of number of turns 332. For example, first turn 333 in number of turns 332 is performed with first constant bank angle 334. In other words, the bank angle of aircraft 304 is substantially the same during first turn 333 in these illustrative examples.

Number of turns 332 in maneuver 324 also may include second turn 336. Second turn 336 is performed using second constant bank angle 338. First constant bank angle 334 and second constant bank angle 338 may be the same magnitude but in opposite directions, depending on the particular implementation.

First turn 333 is on maneuver ground track 344 and crosses intended ground track 306. Maneuver ground track 344 is comprised of positions 352. Second turn 336 is also on maneuver ground track 344 and also results in aircraft 304 crossing intended ground track 306 a second time in these illustrative examples. In these illustrative examples, zero wind ground track 354 comprises positions 356 for aircraft 304 that aircraft 304 should fly over during the performance of maneuver 324 if aircraft 304 is unaffected by wind 308.

In these illustrative examples, information 322 generated by aircraft 304 includes generating information 322 at predetermined intervals. In these illustrative examples, number of turns 332 in maneuver 324 may only include first turn 333 but not second turn 336, depending on the particular implementation. Information 322 generated from first turn 333 may provide sufficient amounts of information 322 to identify information 312 about wind 308. In yet other illustrative examples, additional turns may be present in addition to first turn 333 and second turn 336.

In these illustrative examples, first turn 333 and second turn 336 are in opposite directions to each other relative to intended ground track 306. First constant bank angle 334 and second constant bank angle 338 may be, for example, about 10 degrees, five degrees, or some other suitable value.

In identifying information 312 about wind 308, measured positions 330 for aircraft 304 when flying along maneuver ground track 344 should match positions 356 for zero wind ground track 354 if wind 308 does not affect the operation of aircraft 304. If a deviation is present between any of measured positions 330 and maneuver ground track 344, wind 308 has a sufficient force to affect the operation of aircraft 304 while it flies within aircraft environment 300.

In these illustrative examples, theoretical positions are positions in positions 352 of aircraft 304 flying along maneuver ground track 344. In identifying information 312 about wind 308, the theoretical position for aircraft 304 can be calculated by wind identifier 310 using the following equations:

$$\frac{dx}{dt} = v \cdot \cos(A_z) + v_{wind.x} \quad (1)$$

$$\frac{dy}{dt} = v \cdot \sin(A_z) + v_{wind.y} \quad (2)$$

where $A_z$ is the true airspeed heading of aircraft 304 at any time t. In the illustrative examples, the speed of aircraft 304 may be characterized in a number of different ways. For example, the speed of aircraft 304 may be described using indicated airspeed, true airspeed, and ground speed. The heading for each of these speeds is a compass direction of the aircraft for the particular type of speed. For example, indicated airspeed and true airspeed have the same direction but different magnitudes. Ground speed is the speed of the airplane along the ground and, due to wind effects, may have a different direction and a different magnitude compared to the indicated and true airspeeds.

At any point along the bank maneuver, $A_z = A_{z.int} + A_{z.t}$. In these illustrative examples, the time t is measured relative to when the bank maneuver begins. For example, the maneuver may begin at the time at which aircraft 304 first crosses intended ground track 306. Directions of the x and y coordinates are arbitrary. The true heading angle rate, Q, may be calculated using the following equation:

$$Q = \frac{g \cdot \tan(\varphi)}{v_T} \quad (3)$$

where $$Q := \frac{dA_z}{dt}$$

and Q is the true heading angle rate degrees/sec, $g=32.2$ ft/s², $\varphi$=bank angle degrees, and $v_T$=true speed (ft/s).

Integrating equations 1 and 2 result in the following equations:

$$fx(A_{z0}, v_{wind.x}, j) := \quad (4)$$
$$x_j - \frac{v_T}{Q} \cdot \sin(A_{z0} + Q \cdot \text{time}_j) - v_{wind.x} \cdot \text{time}_j - \left(x_1 - \frac{v_T}{Q} \cdot \sin(A_{z0})\right)$$

$$fy(A_{z0}, v_{wind.y}, j) := \quad (5)$$
$$y_j - \frac{v_T}{Q} \cdot \cos(A_{z0} + Q \cdot \text{time}_j) - v_{wind.y} \cdot \text{time}_j - \frac{v_T}{Q} \cdot \cos(A_{z0})$$

In these illustrative examples, time is time measured from the start of the turn using the constant bank angle. Squaring and summing equations (4) and (5) over all measured positions 330 and taking the derivatives with respect to A, provides:

$$\frac{d fx}{d A_z}(A_{z0}, v_{wind.x}) := \qquad (6)$$

$$\sum_{j=1}^{J_{max}} [fx(A_{z0}, v_{wind.x}, j) \cdot (-\cos(A_{z0} + Q \cdot time_j) + \cos(A_{z0}))]$$

$$\frac{d fy}{d A_z}(A_{z0}, v_{wind.y}) := \qquad (7)$$

$$\sum_{j=1}^{J_{max}} [fy(A_{z0}, v_{wind.y}, j) \cdot (-\sin(A_{z0} + Q \cdot time_j) + \sin(A_{z0}))]$$

Squaring and summing equations (4) and (5) over all measured positions 330 and taking the derivatives with respect to $v_{wind.x}$ and $v_{wind.y}$ provides:

$$\frac{d fx}{d v_{wind.x}}(A_{z0}, v_{wind.x}) := \sum_{j=1}^{J_{max}} [fx(A_{z0}, v_{wind.x}, j) \cdot (-time_j)] \qquad (8)$$

$$\frac{d fy}{d v_{wind.y}}(A_{z0}, v_{wind.y}) := \sum_{j=1}^{J_{max}} [fy(A_{z0}, v_{wind.y}, j) \cdot (-time_j)]. \qquad (9)$$

Adding equations 6 and 7 and using equations 8 and 9 results in the following equations:

$$\frac{d fx}{d A_z}(A_{z0}, v_{wind.x}) + \frac{d fx}{d A_z}(A_{z0}, v_{wind.y}) = 0 \qquad (10)$$

$$\frac{d fx}{d v_{wind.x}}(A_{z0}, v_{wind.x}) = 0 \qquad (11)$$

$$\frac{d fy}{d v_{wind.y}}(A_{z0}, v_{wind.y}) = 0. \qquad (12)$$

Equations 10, 11, and 12 are solved for Az0, $v_{wind.x}$, and $v_{wind.y}$. Measured positions 330 measured during maneuver 324 are used in the equations for x and y, and a least squares analysis is performed on all of measured positions 330. This least squares analysis determines the best values for the three unknowns, initial true airspeed heading, $v_{wind.x}$ and $v_{wind.y}$, by minimizing the differences between the measured position and the theoretical position. In these illustrative examples, the initial true airspeed heading is the same heading that aircraft 304 is flying when aircraft 304 crosses intended ground track 306 while performing maneuver 324. Wind speed and wind direction can be determined from $v_{wind.x}$ and $v_{wind.y}$. The measured position is a position in measured positions 330 as identified by aircraft 304.

In this manner, wind identifier 310 may use true airspeed 331, bank angle 329, and measured positions 330 recorded during maneuver 324. No other information is needed in the illustrative examples.

In this manner, wind identifier 310 identifies information 312 about wind 308, such as speed 316 and direction 318. This information about wind 308 may be used to operate aircraft 304 to follow intended ground track 306 now that information 312 about wind 308 has been identified.

Further, maneuver 324 may be performed a number of different times while aircraft 304 travels along intended ground track 306. Additionally, aircraft 304 may transmit information 312 to other aircraft in number of aircraft 302. For example, aircraft 304 may transmit this information directly to other aircraft in number of aircraft 302. In other illustrative examples, information 312 may be transmitted to remote location 347. In turn, remote location 347 may send information 312 to other aircraft in number of aircraft 302.

Figure 4:
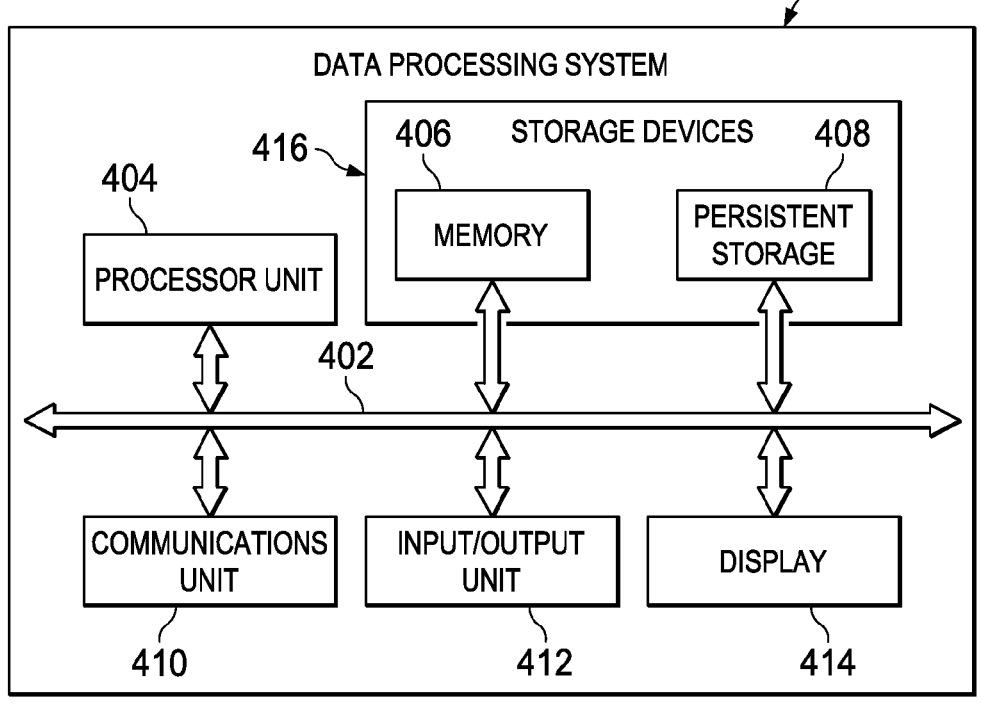
FIG. 4 is an illustration of a data processing system in accordance with an illustrative embodiment.
Figure 4:
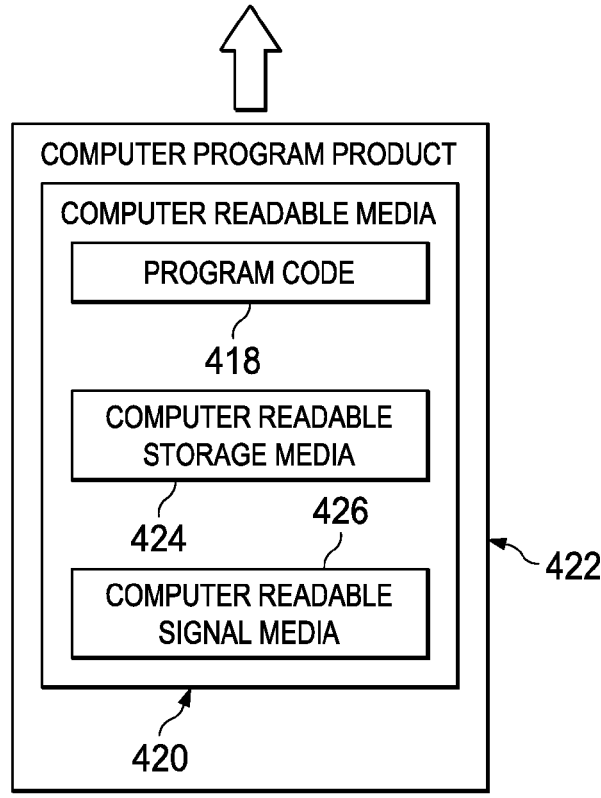

Turning now to FIG. 4, an illustration of a data processing system is depicted in accordance with an illustrative embodiment. Data processing system 400 may be used to implemented one or more computers in computer system 320 in FIG. 3. In this illustrative example, data processing system 400 includes communications framework 402, which provides communications between processor unit 404, memory 406, persistent storage 408, communications unit 410, input/output (I/O) unit 412, and display 414. In this example, communications framework 402 may take the form of a bus system.

Processor unit 404 serves to execute instructions for software that may be loaded into memory 406. Processor unit 404 may be a number of processors, a multi-processor core, or some other type of processor, depending on the particular implementation. Further, in some illustrative examples, wind identifier 310 in FIG. 3 may be implemented using hardware, such as processor unit 404.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these illustrative examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these illustrative examples, provides for communications with other data processing systems or devices. In these illustrative examples, communications unit 410 is a network interface card.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications framework 402. The processes of the different embodiments may be performed by processor unit 404 using computer-implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these illustrative examples. In one example, computer readable media 420 may be computer readable storage media 424 or computer readable signal media 426.

In these illustrative examples, computer readable storage media 424 is a physical or tangible storage device used to store program code 418 rather than a medium that propagates or transmits program code 418. Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 400 are not meant to provide architectural limitations to the manner in which different embodiments may be implemented. The different illustrative embodiments may be implemented in a data processing system including components in addition to and/or in place of those illustrated for data processing system 400. Other components shown in FIG. 4 can be varied from the illustrative examples shown. The different embodiments may be implemented using any hardware device or system capable of running program code 418.

The illustration of aircraft environment 300 in FIG. 3 and data processing system 400 in FIG. 4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, wind identifier 310 may be located at remote location 347 rather than in aircraft 304. For example, wind identifier 310 may be implemented in a computer system or other hardware in remote location 347 that may be a platform, such as, for example, a building, another aircraft, a ship, or some other suitable remote location. Further, aircraft 304 may take a number of different forms. For example, aircraft 304 may be an airplane, a helicopter, an unmanned aerial vehicle, or some other suitable type of aircraft.

As another example, hardware for wind identifier 310 may be implemented using other types of hardware other than computer system 320. For example, the hardware may take the form of a circuit system, an integrated circuit, an application specific integrated circuit (ASIC), a programmable logic device, or some other suitable type of hardware configured to perform a number of operations.

With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

The different components illustrated in FIGS. 1 and 2 may be combined with components in FIG. 3, used with components in FIG. 3, or a combination of the two. Additionally, some of the components illustrated in FIGS. 1 and 2 may be illustrative examples of how components shown in block form in FIGS. 3 and 4 may be implemented as physical components.

Figure 5:
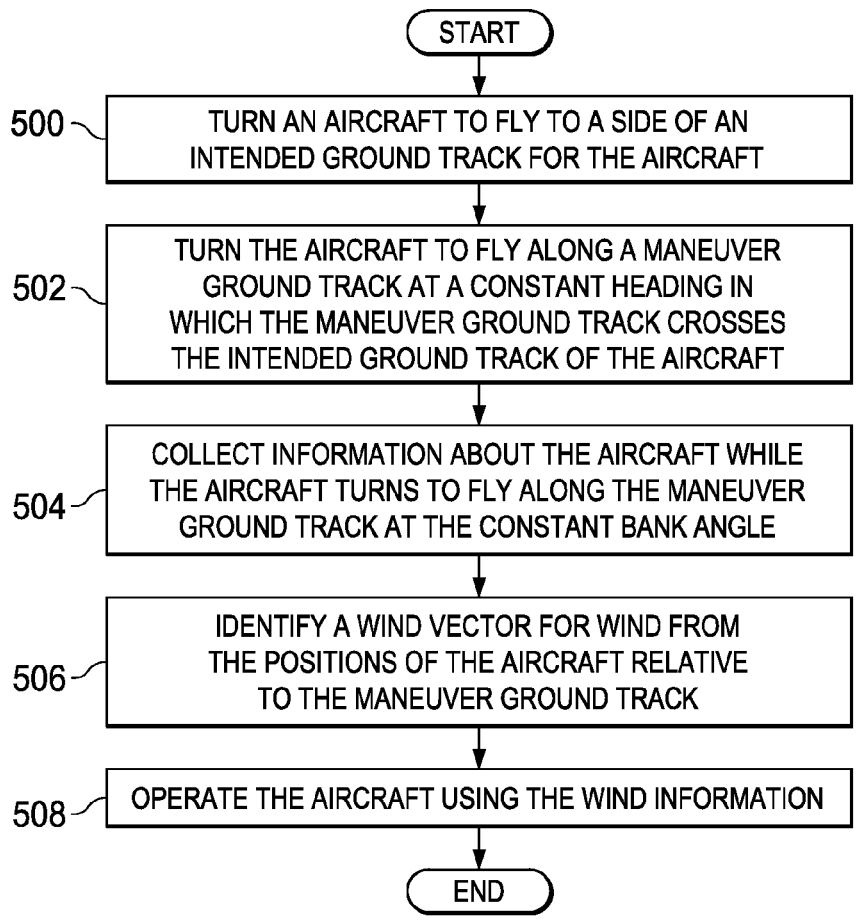
FIG. 5 is an illustration of a flowchart of a process for operating an aircraft in accordance with an illustrative embodiment.

With reference now to FIG. 5, an illustration of a flowchart of a process for operating an aircraft is depicted in accordance with an illustrative embodiment. The process illustrated in FIG. 5 may be implemented in aircraft environment 100 in FIG. 1 or aircraft environment 300 in FIG. 3.

In this illustrative example, the process may turn an aircraft to fly to a side of an intended ground track for the aircraft (operation 500). Thereafter, the aircraft turns to fly along a maneuver ground track at a constant heading in which the maneuver ground track crosses the intended ground track of the aircraft (operation 502). The constant bank angle for the maneuver is initiated at this point. Flying to one side of the intended ground track and then flying a constant heading back towards the intended ground track at true airspeed heading Az0 is a part of the maneuver in these illustrative examples.

The process then collects information about the aircraft while the aircraft turns to fly along the maneuver ground track at the constant bank angle (operation 504). This information may include, for example, positions of the aircraft, speed of the aircraft, and other suitable information. The process then identifies a wind vector for wind from the positions of the aircraft relative to the maneuver ground track (operation 506). Operation 506 also may include using other information about the aircraft.

For example, other information, such as the bank angle, the positions recorded for the aircraft, the true airspeed calculated for the aircraft, and other suitable information, may be used with respect to the equations described above. Information, such as initial true airspeed heading of the aircraft when the aircraft crosses the intended ground track and wind information, may be identified using the equations described above.

The process then operates the aircraft using the wind information (operation 508), with the process terminating thereafter. In operation 508, adjustments may be made to the aircraft such that the aircraft flies along the intended ground track. These adjustments may include, for example, changes in control surface configurations, thrust, and other suitable adjustments. In this manner, the aircraft may be operated to fly more closely along an intended ground track.

Figure 6:
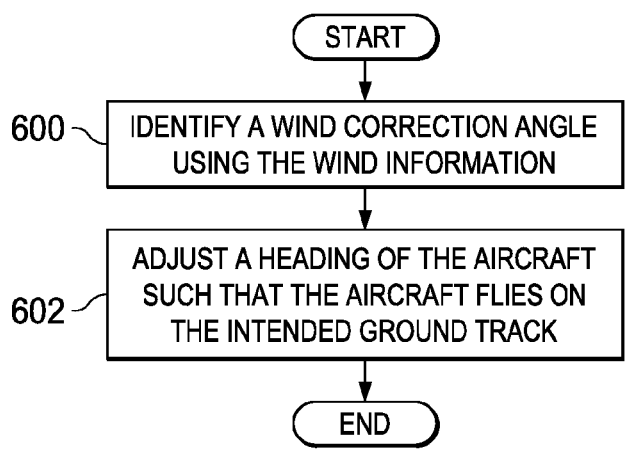
FIG. 6 is an illustration of a flowchart of a process for operating an aircraft using wind information in accordance with an illustrative embodiment.

With reference now to FIG. 6, an illustration of a flowchart of a process for operating an aircraft using wind information is depicted in accordance with an illustrative embodiment. The process illustrated in FIG. 6 is one example of operations that may be performed for operation 508 in FIG. 5.

The process begins by identifying a wind correction angle using the wind information (operation 600). The process then adjusts a heading of the aircraft such that the aircraft flies on the intended ground track (operation 602), with the process terminating thereafter.

In these illustrative examples, the process in FIG. 6 may be performed automatically by the aircraft. The operations in FIGS. 5 and 6 may be performed in a number of different ways. For example, these operations may be performed automatically by a computer system for the aircraft. This computer system may be located in the aircraft or in an oriented remote location. In the illustrative examples, performing an operation automatically, means that the operation may be performed without needing user input to initiate performance of the operation.

Figure 7:
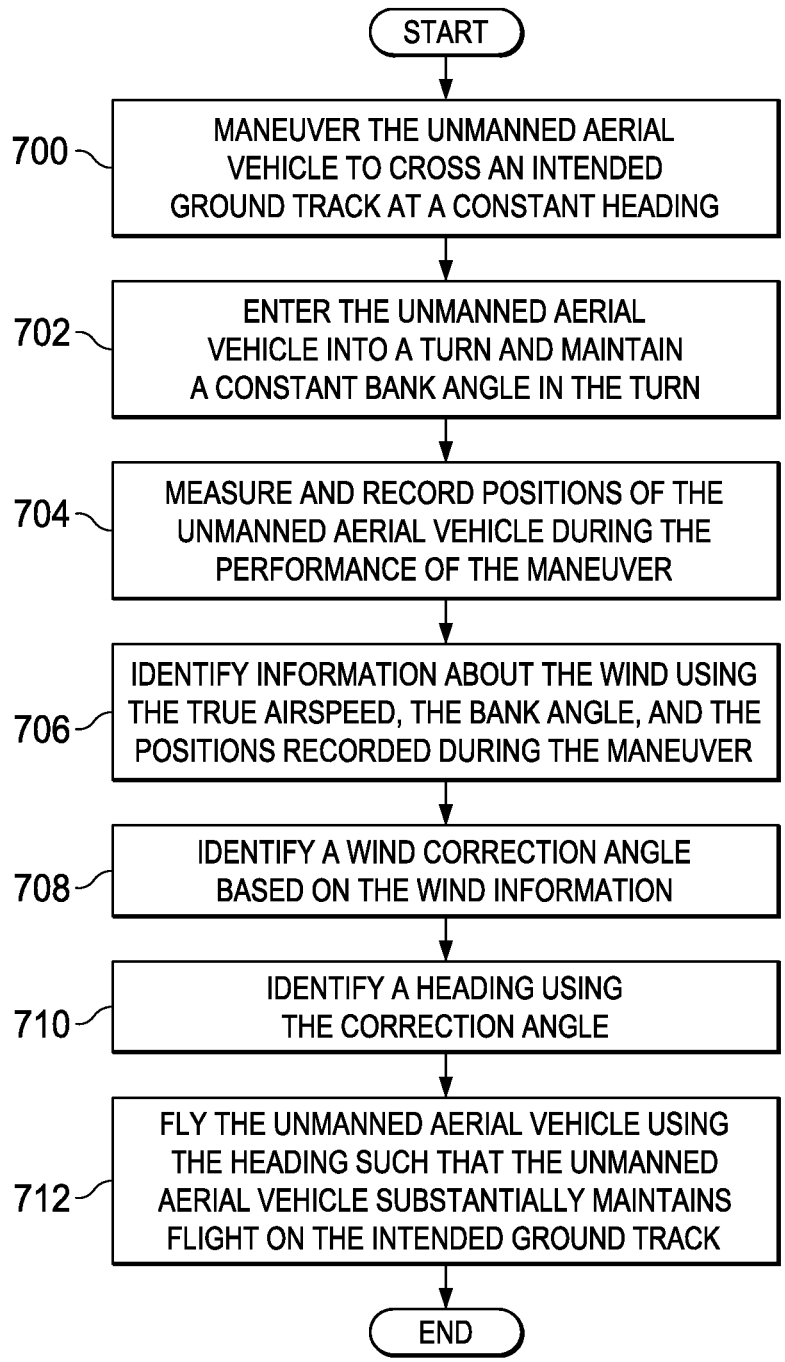
FIG. 7 is an illustration of a flowchart of a process for operating an unmanned aerial vehicle in accordance with an illustrative embodiment.

Turning now to FIG. 7, an illustration of a flowchart of a process for operating an unmanned aerial vehicle is depicted in accordance with an illustrative embodiment. This process may be implemented in an unmanned aerial vehicle, such as unmanned aerial vehicle 104 in FIG. 1. The different operations may be performed automatically without requiring user input.

The process begins by maneuvering the unmanned aerial vehicle to cross an intended ground track at a constant heading (operation 700). In the illustrative examples, the intended ground track is crossed with a bank angle of about zero. In other words, the intended ground track is crossed with the wings of the unmanned aerial vehicle being level in these illustrative examples.

Thereafter, the unmanned aerial vehicle enters into a turn and maintains a constant bank angle in the turn (operation 702). This turn results in the unmanned aerial vehicle crossing the intended ground track.

Positions of the unmanned aerial vehicle are measured and recorded during the performance of the maneuver (operation 704). The unmanned aerial vehicle then identifies information about the wind using the true airspeed, the bank angle, and the positions recorded during the maneuver (operation 706). The wind information includes a speed of the wind and a direction of the wind. In other words, this wind information may be a vector of the wind encountered by the unmanned aerial vehicle.

The unmanned aerial vehicle identifies a wind correction angle based on the wind information (operation 708). A heading is then identified using the correction angle (operation 710). In the illustrative examples, this heading is a heading for the true airspeed of the unmanned aerial vehicle. This heading may be referred to as a wind correction course heading. The unmanned aerial vehicle then flies using the heading such that the unmanned aerial vehicle substantially maintains flight on the intended ground track (operation 712), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

For example, operation 508 may be replaced by an operation in which the information about the wind is transmitted to another aircraft for use. This second aircraft may be in the vicinity of the aircraft used to identify the information about the wind. This process also may be repeated periodically or along different portions of an intended ground track.

Thus, the different illustrative embodiments provide a method and apparatus for operating an aircraft. The different illustrative embodiments provide an ability to identify information about wind that may affect the flight of an aircraft along an intended ground track.

One or more of the illustrative embodiments allow for an identification of wind information for an aircraft without using other mechanisms, such as weather balloons. Further, the information identified about the winds may be more accurate than using other mechanisms, such as weather balloons. In the illustrative examples, the effect of the wind on the aircraft performing maneuvers is used to identify information about the winds that actually affect the flight of the aircraft.

Also, one or more illustrative embodiments do not involve transmitting information between the aircraft and an air traffic control service. In this manner, additional equipment may not be needed to identify information about winds in operating the aircraft. As a result, less weight, expense, and complexity may be present in an aircraft.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, one or more illustrative embodiments provide a method and apparatus for identifying information about wind that may affect the flight of an aircraft over a ground track. In particular, one or more illustrative embodiments may be applied to operating unmanned aerial vehicles.

In the illustrative examples, with the information identified about the wind, an automatic calculation of a heading from an automatically determined wind correction angle by the use of a constant bank angle may be used to reduce repeated course corrections when a cross wind is not accounted for along a route of flight.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for operating an unmanned aerial vehicle, the method comprising:

flying the unmanned aerial vehicle at a constant bank angle in which the unmanned aerial vehicle crosses an intended ground track for the unmanned aerial vehicle, wherein the constant bank angle is a first constant bank angle and wherein flying the unmanned aerial vehicle at the constant bank angle in which the unmanned aerial vehicle crosses the intended ground track for the unmanned aerial vehicle comprises: flying the unmanned aerial vehicle in a first turn at the first constant bank angle in which the unmanned aerial vehicle crosses the intended ground track for the unmanned aerial vehicle, and flying the unmanned aerial vehicle in a second turn at a second constant bank angle in which the unmanned aerial vehicle crosses the intended ground track for the unmanned aerial vehicle from an opposite direction of the intended ground track;

identifying information about a wind using positions of the unmanned aerial vehicle flying at the constant bank angle, wherein identifying the information about the wind using the positions of the unmanned aerial vehicle flying at the constant bank angle comprises identifying the information about the wind using the positions of the unmanned aerial vehicle flying at the first constant bank angle and the second constant bank angle; and adjusting flight of the unmanned aerial vehicle to fly on the intended ground track based on the wind identified by identifying a wind correction angle using the information about the wind identified and adjusting a heading of the unmanned aerial vehicle such that the unmanned aerial vehicle flies on the intended ground track.

2. The method of claim 1, wherein the steps of flying the unmanned aerial vehicle at the constant bank angle in which the unmanned aerial vehicle crosses the intended ground track for the unmanned aerial vehicle; identifying the information about the wind using the positions of the unmanned aerial vehicle flying at the constant bank angle; and adjusting the flight of the unmanned aerial vehicle to fly on the intended ground track based on the wind identified are performed automatically by a computer system for the unmanned aerial vehicle.

3. The method of claim 1, wherein flying the unmanned aerial vehicle at the constant bank angle in which the unmanned aerial vehicle crosses the intended ground track for the unmanned aerial vehicle comprises:

flying the unmanned aerial vehicle along a maneuver ground track at the constant bank angle across the intended ground track of the unmanned aerial vehicle.

4. The method of claim 1 further comprising:

recording the positions of the unmanned aerial vehicle while the unmanned aerial vehicle flies at the constant bank angle.

5. The method of claim 1 further comprising:

identifying a true airspeed for the unmanned aerial vehicle when crossing the intended ground track and wherein identifying the information about the wind using the positions of the unmanned aerial vehicle flying at the constant bank angle comprises:

identifying the information about the wind using the positions, the constant bank angle, and the true airspeed of the unmanned aerial vehicle.

6. The method of claim 1, wherein identifying the information about the wind comprises:

identifying a wind vector.

* * * * *